Figure 1:
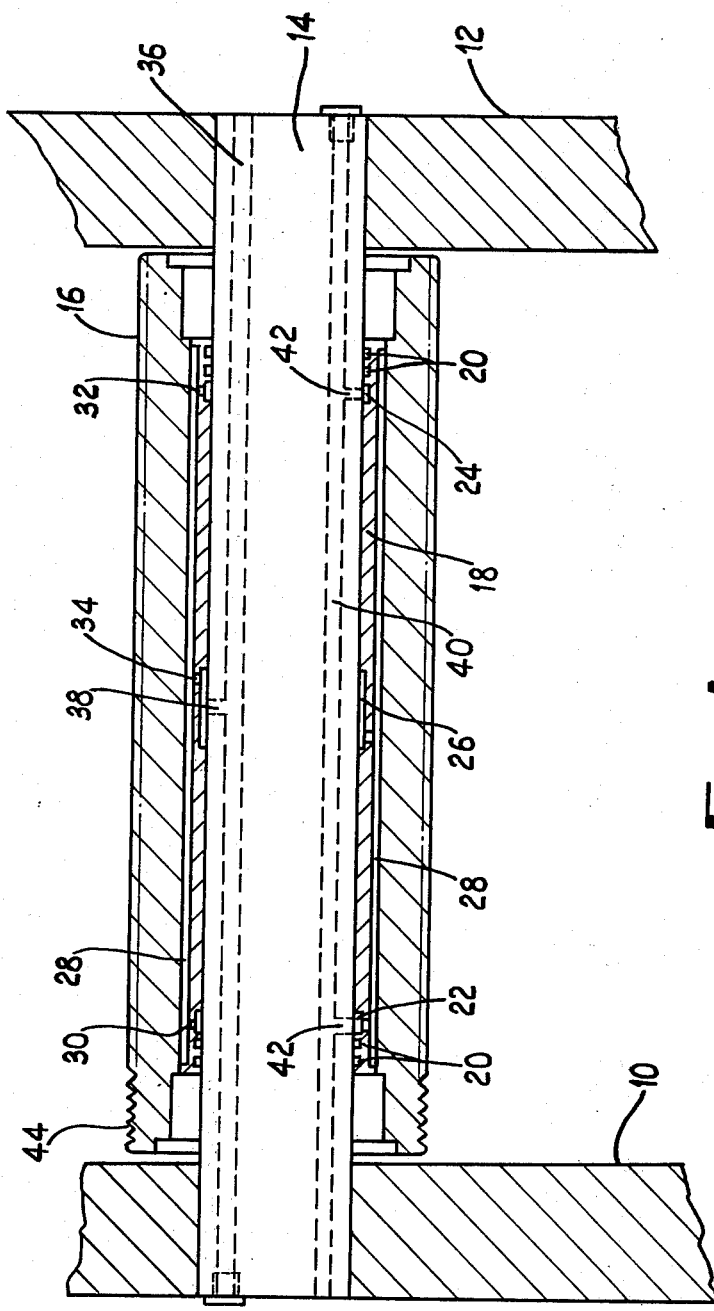

United States Patent [19]
Aspin

[11] 3,972,671
[45] Aug. 3, 1976

[54] ROLL ASSEMBLY FOR USE IN PROFILING FILM

[76] Inventor: Frank Metcalf Aspin, Barnacre, Bexton Lane, Knutsford, Cheshire, England

[22] Filed: May 7, 1975

[21] Appl. No.: 575,966

[30] Foreign Application Priority Data
May 8, 1974 United Kingdom............... 20197/74

[52] U.S. Cl................................. 425/363; 425/369
[51] Int. Cl.² ....................................... B29C 17/00
[58] Field of Search ........... 425/363, 369, 384, 403

[56] References Cited
UNITED STATES PATENTS

| | | | |
|---|---|---|---|
| 2,752,632 | 7/1956 | Winstead | 425/363 |
| 3,313,002 | 4/1967 | Wyeth | 425/363 X |
| 3,857,664 | 12/1974 | Johnson et al. | 425/363 X |

Primary Examiner—J. Howard Flint, Jr.
Attorney, Agent, or Firm—Spencer & Kaye

[57] ABSTRACT

Disclosed is a roll assembly for use in the profiling of film of plastics material. The assembly is characterized by conduits, passageways, and spaces, by means of which heating fluid may be fed to and removed from the assembly in a selective manner along the length of the assembly to facilitate differential heating. This is a very advantageous facility where, for any reason, operating conditions would otherwise give rise to uneven profiling.

4 Claims, 3 Drawing Figures

ROLL ASSEMBLY FOR USE IN PROFILING FILM

This invention concerns the treatment of films of plastics material, such as polypropylene, which can be produced with such characteristics that when stretched in a given direction by an appropriate amount and under appropriate conditions become so weakened in a direction transverse to the direction of stretch that they can readily be divided to provide longitudinal strands, and so strengthened in the direction of stretch that the strands have a strength adequate for textile applications (hereinafter called "films of plastics material of the type described"). The words "textile applications" are to be understood in a broad sense: for example the conversion of the strands into, or the use of the strands as, cord, twine, thread and yarn is contemplated.

The invention is more particularly concerned with apparatus comprising a roll adapted to be heated, in the periphery of which are a series of annular grooves and which forms a nip with a plain-surfaced roller, or another grooved roller, through which nip a film of plastics material is passed so as either to modify the cross-sectional shape of the film to provide alternately across its width enlarged portions from which strand-forms will be produced, and portions of reduced thickness which serve to preserve the transverse continuity of the film for the time being, or wholly or partially to sever the film into strand-forms.

It has been found difficult to control the profiling of film in the manner just described so that the modification or severing of the film occurs uniformly. One of the factors affecting the uniformity of the profiling is the manner of heating any grooved roll used in forming the aforesaid nip. In some cases it is necessary, in order to improve the uniformity of the profiling, to ensure that the grooved roll or rolls are kept hotter at the centre than at the ends, and the object of the present invention is to provide a roll construction which facilitates this.

According to the present invention a roll assembly for use in the profiling of film of plastics material comprises at least one fluid inlet conduit extending within, and along the length of, the roll assembly; at least one fluid outlet conduit extending within, and along the length of, the roll assembly, a plurality of passageways disposed between the outer periphery of the roll assembly and the inlet and outlet conduits and extending along the length of the roll assembly; at least one fluid-conveying connection, in the region of each end of the roll assembly, between each passageway and a fluid outlet conduit, and at least one fluid-conveying connection, in the central region of the roll assembly, between each passageway and a fluid inlet conduit.

In one form of the invention the roll assembly comprises a fixed elongate bearing core member, in which said fluid inlet and outlet conduits are formed, and a sleeve in close-fitting relationship with said bearing core member so as to bear and be rotatable thereon, said sleeve including a part of larger diameter in the periphery of which is formed a series of annular profiling grooves, and a part of smaller diameter secured within the larger diameter part, the two parts defining together the plurality of passageways, each extending axially within the sleeve, and the smaller diameter part defining, together with the bearing core member, annular spaces at the centre and end regions, there being conduits in the smaller diameter part connecting said annular spaces and each of said passage ways, and in said bearing core member each connecting the end region annular spaces to a fluid outlet conduit, and the or each centre region annular space to a fluid inlet conduit.

In another form of the invention the roll assembly comprises a pair of stub axles, a hollow sleeve mounted thereon for rotation therewith, and in the periphery of which is formed a series of annular profiling grooves, one of the stub axles having an extension thereto, in which said fluid inlet and outlet conduits are formed lying within said hollow sleeve and abutting the other stub axle, said extension and the bore of said hollow sleeve defining together the plurality of passageways, and annular spaces at the centre and end regions of said extension connecting with said passageways, there being conduits in said extension each connecting said end region annular spaces to a fluid outlet conduit and the or each centre region annular space to a fluid inlet conduit.

Figure 2:
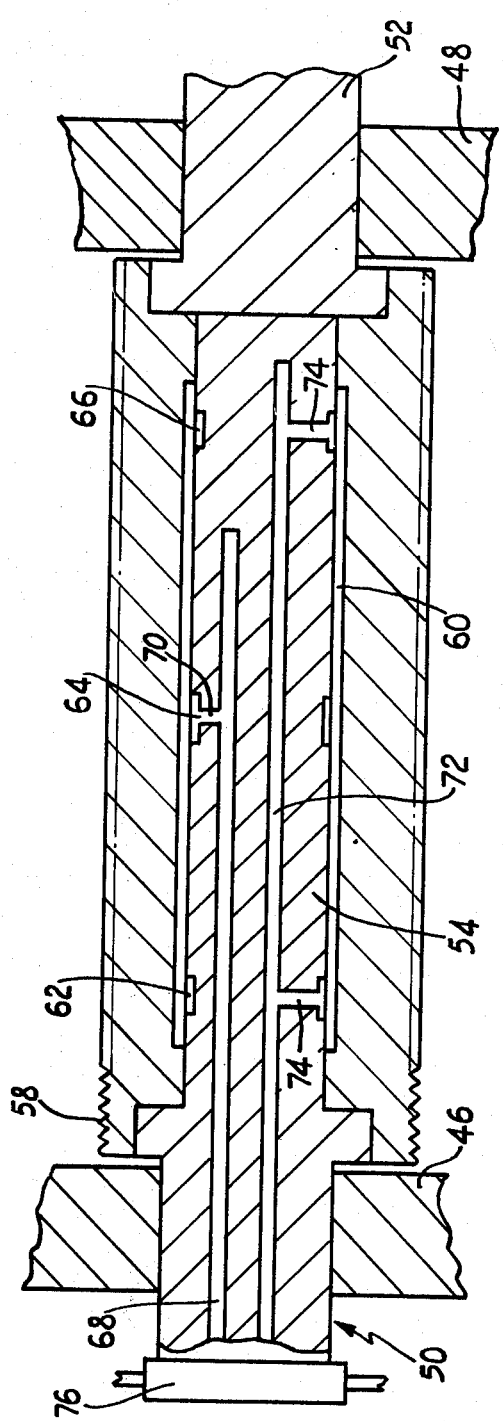
Figure 3:
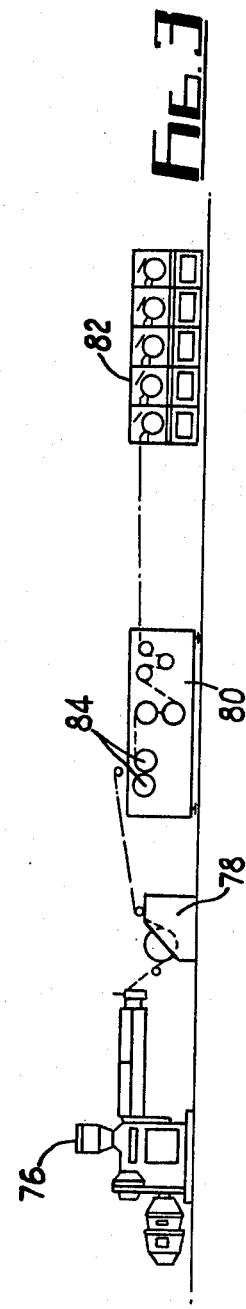

The invention will now be described further, by way of example only, with reference to the accompanying drawings, in which, FIG. 1 is a part-sectional longitudinal view of one form of roll assembly according to the invention;

FIG. 2 is a part-sectional longitudinal view of another form of roll assembly according to the invention, and FIG. 3 is a diagram of a production line of machines in which roll assemblies according to the invention may be used.

The roll assembly is supported in machine frame members 10,12. It consists of a bearing core member 14 fixed non-rotatably in the frame members 10,12, and a sleeve rotatably mounted on the core member 14. The sleeve has two parts, namely a larger diameter part 16, and a smaller diameter part 18, the latter being a drive fit in the former. In the inner and outer surfaces of the part 18 are certain machined formations, comprising seal grooves 20, and annular grooves 22, 24, 26, in the inner surface, and passageways 28 extending axially of the assembly and at frequent intervals, for example at one eighth of an inch spacing, in the outer surface. Additional conduits 30,32,34 connect the annular grooves to each of the passageways. The bearing core member 14 has conduits 36,38 providing heating fluid inlet to annular groove 26 and conduits 40,42 providing heating fluid outlet from the annular grooves 22,24. The larger diameter part 16 of the sleeve has annular profiling grooves 44 in its periphery.

In the interests of clarity not all the details of the mounting and driving of the roll assembly have been shown. For example the assembly may be gear driven, one end of the assembly mounting an annular ring having the necessary gear teeth.

In operation, heating oil is supplied to conduit 36 from where it passes to conduit 38, annular space 26, conduits 34, passageways 28, conduits 30,32 annular spaces 20,22 and away through conduits 42,40. In this way the sleeve is kept hotter at the centre than at the ends and by suitably controlling the flow rate and temperature of the heating oil it has been found possible substantially to compensate for any tendency for the film to be inadequately profiled at its centre region relative to its side portions. Thus it has been found, for example, that when processing film after its passage through liquid such as water there is a tendency for the film, during processing to conduct away more heat from the centre region of the roll assembly than from its ends. This causes the assembly to contract more at its centre region and the profiling there to be inadequate. By making use of the present invention this tendency can be corrected, at least to some extent. Again rolls forming pressure nips tend to bow, which again leads to inadequate profiling at the centre region. By ensuring that the roll assembly is hotter at its middle region an initial, slightly barrel shape is obtained, so that when the pressure is applied bowing is compensated for.

Referring now to FIG. 2, the roll assembly, is as before, supported in machine frame members 46, 48 but for rotation as a whole. With this end in mind a pair of stub axles 50,52 is provided, journalled for rotation in frame members 46,48. The stub axle 50 has an extension 54 which abuts stub axle 52. Securely mounted on the stub axles 50,52, so as to rotate therewith is a sleeve 56 in the outer periphery of which are annular profiling grooves 58, and in the bore of which are a plurality of longitudinal grooves 60. In the extension 54 of stub axle 50 are annular grooves 62,64,66, conduits 68,70 for heating fluid inlet, and conduits 72,74 for heating fluid outlet.

Stub axle 50 is extended outside the frame member 46 for the filling means 76 for facilitating the supply of heating fluid to the conduit 68 and receiving it from conduit 72 suitable such means are commercially available. Stub axle 52 is extended outside the frame member 48 for the application of a drive thereto.

The roll assembly of FIG. 2 operates in the same way as that of FIG. 1, heating oil being supplied via conduits 68,70 to annular space 64 and thus to passageways 60. It leaves the assembly via annular spaces 62,66 and conduits 74,72.

In FIG. 2, as in FIG. 1, detail irrelevant to an understanding of the present invention has been omitted for the sake of clarity.

In the two embodiments of the invention just described there is one heating oil inlet location disposed centrally of the roll assembly, and two heating oil outlet locations disposed at the ends of the roll assembly. There may of course be more than one inlet location and more than two outlet locations, and variation of the number and in the positioning of the inlets and outlets along the length of the roll assembly enable different patterns of temperature control to be achieved.

Finally FIG. 3 shows a typical machine production line involving the profiling of film of plastics material, specifically for producing fibre from polypropylene film. It consists of an extruder 76, a chill roll assembly 78, a fibre producing unit 80, and a multiple winder 82.

The unit 80 includes two roll assemblies 84 constructed according to the invention.

I claim:

1. A roll assembly for use in the profiling of film of plastics material comprising at least one fluid inlet conduit extending within, and along the length of, the roll assembly; at least one fluid outlet conduit extending within, and along the length of, the roll assembly; a plurality of passageways disposed between the outer periphery of the roll assembly and the inlet and outlet conduits and extending along the length of the roll assembly; at least one fluid-conveying connection, in the region of each end of the roll assembly, between each passageway and a fluid outlet conduit; and at least one fluid-conveying connection, in the central region of the roll assembly, between each passageway and a fluid inlet conduit.

2. A roll assembly as claimed in claim 1 comprising a fixed elongate bearing core member, in which said fluid inlet and outlet conduits are formed, and a sleeve in close-fitting relationship with said bearing core member so as to bear and be rotatable thereon, said sleeve including a part of larger diameter in the periphery of which is formed a series of annular profiling grooves, and a part of smaller diameter secured within the larger diameter part, the two parts defining together the plurality of passageways, each extending axially within the sleeve, and the smaller diameter part defining, together with the bearing core member, annular spaces at the centre and end regions, there being conduits in the smaller diameter part connecting said annular spaces and each of said passageways, and in said bearing core member each connecting the end region annular spaces to a fluid outlet conduit, and the or each centre region annular space to a fluid inlet conduit.

3. A roll assembly as claimed in claim 1 comprising a pair of stub axles, a hollow sleeve mounted thereon for rotation therewith and in the periphery of which is formed a series of annular profiling grooves, one of the stub axles having an extension thereto, in which said fluid inlet and outlet conduits are formed lying within said hollow sleeve and abutting the other stub axle, said extension and the bore of said hollow sleeve defining together the plurality of passageways, and annular spaces at the centre and end regions of said extension connecting with said passageways, there being conduits in said extension each connecting said end region annular spaces to a fluid outlet conduit and the or each centre region annular space to a fluid inlet conduit.

4. A machine for profiling a film of plastics material comprising at least one roll assembly as claimed in claim 1.

* * * * *